(12) United States Patent
Hochmuth et al.

(10) Patent No.: US 7,797,435 B2
(45) Date of Patent: Sep. 14, 2010

(54) FOREGOING USER CREDENTIAL COLLECTION IF SENDING SYSTEM IS IN AN UNAUTHENTICATED MUTUALLY EXCLUSIVE CONNECTION STATE

(75) Inventors: Roland M. Hochmuth, Fort Collins, CO (US); Johnny Marks, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 549 days.

(21) Appl. No.: 11/669,308

(22) Filed: Jan. 31, 2007

(65) Prior Publication Data
US 2008/0180388 A1    Jul. 31, 2008

(51) Int. Cl.
*G06F 15/16* (2006.01)
(52) U.S. Cl. .................. 709/229; 709/202; 709/203; 709/227; 713/168
(58) Field of Classification Search ......... 709/202–203, 709/225–229; 713/168–169
See application file for complete search history.

(56) References Cited

U.S. PATENT DOCUMENTS

| | | | | |
|---|---|---|---|---|
| 6,115,376 | A  * | 9/2000 | Sherer et al. ................. | 709/224 |
| 7,174,565 | B2 * | 2/2007 | Kadyk et al. .................. | 726/12 |
| 7,188,360 | B2 * | 3/2007 | Gerdes et al. ................ | 709/229 |
| 7,457,953 | B2 * | 11/2008 | First et al. ................... | 713/169 |
| 7,506,369 | B2 * | 3/2009 | Buch et al. ................... | 709/225 |

\* cited by examiner

*Primary Examiner*—Bharat N Barot

(57) ABSTRACT

A method comprises a receiving system establishing a first connection to a sending system. The method also comprises determining whether the sending system is in an unauthenticated mutually exclusive connection (UMEC) state. The method further comprises foregoing collecting user credentials to establish a connection between the receiving and sending systems if the sending system is in the UMEC state, and collecting user credentials to establish a connection between the receiving and sending systems if the sending system is not in the UMEC state.

20 Claims, 4 Drawing Sheets

FOREGOING USER CREDENTIAL COLLECTION IF SENDING SYSTEM IS IN AN UNAUTHENTICATED MUTUALLY EXCLUSIVE CONNECTION STATE

BACKGROUND

Some electronic systems permit a user of one computer to view on his or her display images (graphics and text) that are generated on another computer remotely located from the user's computer. In some such "remote visualization" systems, the remote computer, which generates the graphics data, transmits compressed or uncompressed images to the user's computer that cause the user's computer to copy or move pixel data around on the user's display to replicate the images on the remote computer where the images originated.

In such remote visualization systems, the user often is authenticated twice—first by user's computer gathering a credential to be authenticated by the remote computer to log on to the remote computer, and again by the remote computer to log the user on to operating system's "desktop" of the remote computer. Authenticating a user comprises the user entering his or her credentials (e.g., a username and password). Authenticating the user multiple times is inconvenient and bothersome to the user.

BRIEF DESCRIPTION OF THE DRAWINGS

For a detailed description of exemplary embodiments of the invention, reference will now be made to the accompanying drawings in which.

DETAILED DESCRIPTION

Figure 1:
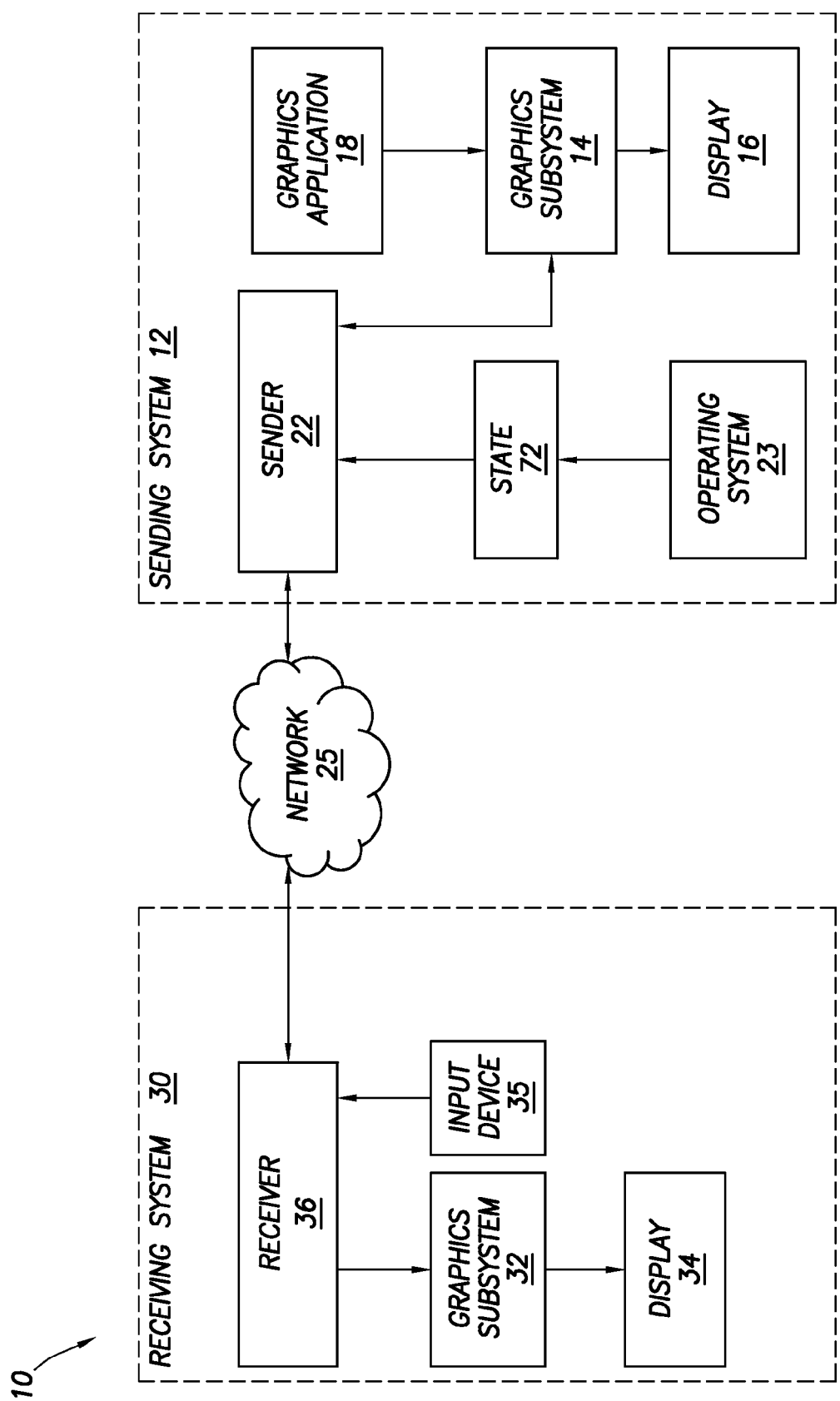
FIG. 1 shows a system in accordance with various embodiments comprising a sending system and a receiving system.
Figure 2:
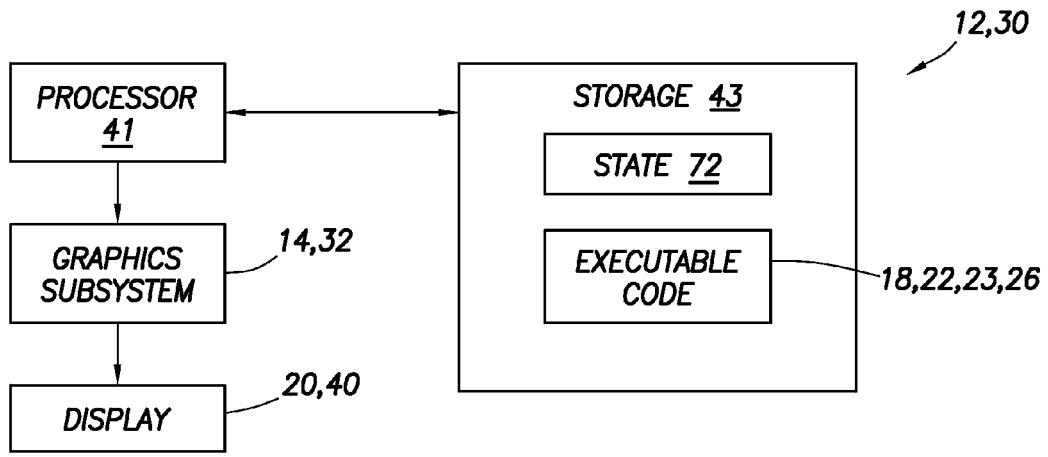
FIG. 2 shows an embodiment exemplary of a sending or a receiving system.

FIG. 1 shows an embodiment of a system 10 that comprises a sending system 12 and a receiving system 30 in communication with each other by way of a network 25. The systems are remotely coupled to one another via the network. Either system can be considered to be a "remote" system (relative to the other system) and either system can be considered to be a "local" system (relative to the other system). Network 25 may comprise the Internet or other form of communication network. As shown, the sending system 12 comprises a graphics subsystem 14, a display 16, a graphics application 18, a sender 22, an operating system 23, and state information 72. The graphics application 18 and sender 22 comprise executable code. The receiving system 30 comprises a graphics subsystem 32, a display 34, and a receiver 36. The receiver 36 comprises executable code. Referring briefly to FIG. 2 in conjunction with FIG. 1, each of the sending system 12 and receiving system 30 comprises a processor 41, storage 43, and, as noted above, a graphics subsystem 14, 32 and a display 16, 34. Each executable code (i.e., the graphics application 18, the sender 22, the operating system 23, and the receiver 36) in the illustrated embodiment are executed by the respective processor 41 in that system and are stored in storage 43. Storage 43 also contains the state information 72. Storage 43 may comprise volatile storage (e.g., random access memory), non-volatile storage (e.g., hard disk drive) or a combination thereof. Each of the graphics subsystems 14 and 32 may comprise additional executable code such as application programming interfaces (APIs), graphics drivers, one or more hardware components such a graphics adapter, etc. Each graphics subsystem also includes at least one frame buffer into which pixel color values are temporarily stored to render pixels on the associated display.

In some embodiments, the sending system 12 has a display 16 coupled thereto, but in other embodiments, the sending system's display 16 is not included. The receiving system 30 may include an input device 35, such as a keyboard or mouse, which permits a user of the receiving system to effectively interact with the graphics application 18 as if the graphics application were being executed on the receiving system 30.

Referring to FIG. 1, sending system 12 executes a graphics application 18 that causes images (e.g., text, lines, fills) to be shown by the graphics subsystem 14 on the display 16. The graphics application 18 comprises any one or more of a plurality of executable programs that use a graphics API. The APIs used by the graphics application are implemented by the graphics subsystem 14. The graphics application 18 causes images to be shown on display 16 by providing graphics commands to the graphics subsystem 14 which creates and stores images in a frame buffer in the graphics subsystem 14. The sender 22 reads the images from the graphics subsystem's frame buffer and, in at least some embodiments, compresses the images for subsequent transmission to the receiving system 30. Via network 25, the sending system 12 sends the compressed images to the receiving system 30. The receiving system 30 receives the compressed images from the sending system, decompresses the images, and shows the decompressed images on display 34. The process is repetitive as the sending system continues to render new or updated images in its own graphics subsystem 14.

In accordance with various embodiments, through the network 25, the receiver 36 establishes a communication "connection" to the sender 22 of a particular sending system 12. Establishing a connection means Once the connection is established, the graphics images generated by the sending system 12 are replicated on the receiving system's display 34 as described above.

In at least some situations, the user of the receiving system 30 is authenticated multiple times—once, for example, to establish the connection between the receiver 36 and the sender 22 and again to log in to the sending system's desktop or console. For each authentication process, the user enters his or credentials. Credentials comprise any type of information by which the user can be authenticated. An example of user credentials comprises a username and password that are entered by an input device such as the input device 35 of the receiving system 30. Such credentials can be entered, for example, in a login dialog box. Other examples comprise biometrics (e.g., fingerprint, retinal scan), a smart card, etc.

In at least some embodiments, a user of the receiving system 30 is prompted to enter his or credentials to establish a connection to the sender 22. If the user is successfully authenticated, a connection is established between the receiver 36 and sender 22. If the sending system is at a state in which no user is logged in to the "desktop" or "console" of the sending system's operating system 23, the user again authenticates himself or herself, this time to the desktop or console of the sending system's operating system 23. If the user is successfully authenticated to the desktop or console, the user is permitted to access various resources on the sending system 12; otherwise, the user is denied access to the sending system's resources. The sending system's process for authenticating the user is implemented, in at least some embodiments by the sending system's operating system 23. In at least some situations, therefore, the user of the receiving system 30 will enter his or her credentials at least twice.

It is possible, however, that a user has already logged in to the desktop or console of the sending system's operating system 23 when a new user causes his or her receiver 36 to establish a connection to the same sender 22. In this situation, the new user has already been authenticated once to establish the connection between the receiver 36 and sender 22. The sender 22 responds to the establishment of the new connection by showing a dialog box on the display of the "senior" user (i.e., the user that has already logged in to the operating system's desktop or console) requesting the current user to allow or disallow the new user from accessing the sending system 12. If allowed, the two users enter a collaboration mode in which the displays 34 of both users' receiving systems 30 are presented with the same images (i.e., the images generated by the sending system 12 to which both users' receivers 36 have connected). In these situations, in which a user has already logged in to the sending system's operating system by the time a subsequent ("junior") user attempts to establish a connection to the same sending system, the new user will have entered his credentials to establish the receiver-sender connection, but not a second time to access the sending system's operating system and/or desktop/console. In such situations, the user's credentials are entered only once.

Thus, in situations in which a user is already logged in to the desktop or console of the sending system's operating system 23, a subsequent user is authenticated once and thus provides his or her credentials only once. However, in situations in which no user is already logged in to the desktop or console of the sending system's operating system 23, a user attempting to connect to the sender 22 of the sending system 12 is authenticated twice and thus provides the credentials twice—once to establish the receiver-sender connection and again to log in to the sending system's desktop/console. To preclude the user from having to twice authenticate himself or herself in these latter situations, in which multiple authentications would otherwise occur, the receiver 36 foregoes providing the credentials to establish the connection.

However, it is not always possible or desirable to forego having the user to enter his or her credentials to establish the connection. For example, it is possible for multiple users to attempt concurrently to log in to the desktop or console of the sending system's operating system 23. It is thus possible for user A to connect to a sending system's sender 22 and enter his or her credentials (e.g., username and password) in the sending system's desktop login dialog box. Such a dialog box may require the user to "click" an "OK," "CONTINUE," or equivalent button once the credentials are entered. However, before user A clicks the OK or CONTINUE button, a user B could establish a connection with the same sender 22. At that point, user B would see on his or her own display the same login dialog box in which user A has already entered his or her valid credentials. User B would have only to click the OK or CONTINUE button to log in to the sending system's desktop or console, even though user B might not otherwise have had access to a valid set of credentials. A security breach would thus have occurred.

Another example of when foregoing receiving system user authentication is not desirable is as follows. User A may have already logged in to the desktop or console of the sending system's operating system 23. User B then may attempt to connect to the same sender 22 to which user A is already connected. If user B's receiving system 30 does not collect a credential for authentication by the sending system to authenticate user B, and user A is already logged in to the desktop or console, user B will not be authenticated at all.

To address security loopholes such as those mentioned above, in accordance with various embodiments the receiver 36 foregoes collection of a credential for authentication by the sending system 12 for user authentication if the sending system 12 is in an unauthenticated mutually exclusive connection (UMEC) state. By way of an exemplary definition, a UMEC state is a state in which it is not possible for another user to have already started to log in to desktop or console of the sending system 12, nor for another user to even be able to log in to or unlock the sending system's desktop or console.

In at least some embodiments, the UMEC state is determined to exist if the following three illustrative conditions are true. The first condition is that the sending system 12 comprises a system that does not enable user authentication via a mechanism other than by way of a receiving system 30. This condition is met if, for example, the sending system 12 comprises a "headless" computer (i.e., a computer such as a blade computer that does not provide physical connections for an input/output device which a user would otherwise be able to interact with the sending system 12.

The second condition that defines an embodiment of the UMEC state in at least some embodiments is that, besides the present connection, no other connection has already been established between the sender 22 and a receiver 36, or between the sender 22 and a receiver 36 of another receiving system 30.

Figure 3:
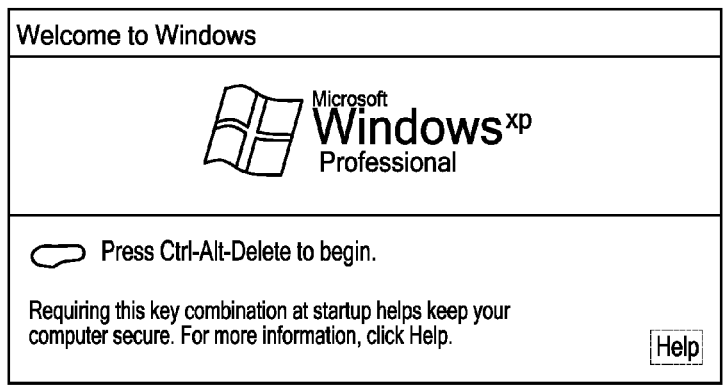
FIG. 3 illustrates an embodiment of a logged out notice dialog graphic.
Figure 4:
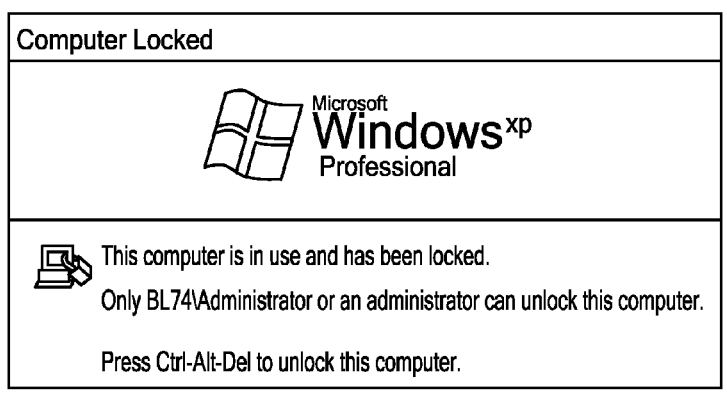
FIG. 4 illustrates an embodiment of a locked dialog graphic.

The third condition that defines an embodiment of the UMEC state in at least some embodiments is that the sending system's graphics subsystem 14 is currently generating a graphic that indicates no user is currently logged into the sending system's desktop or console, or that that, while a user is logged in to the desktop or console, the desktop or console is in a locked state. In some embodiments, this graphic comprises either of a "logged out notice" dialog graphic or a "locked notice" dialog graphic. An embodiment of the logged out notice dialog graphic is illustrated in FIG. 3 and an embodiment of the locked notice dialog graphic is illustrated in FIG. 4. The logged out notice dialog graphic (FIG. 3) indicates that the user is to concurrently press the <Ctl>, <Alt>, and <Del> keys to permit the user to then enter a username and password via a login dialog box. The locked notice dialog graphic (FIG. 4) indicates a user previously logged into the sending system, but that currently no one is logged into the desktop or console and that the sending system's desktop or console is locked. The graphic of FIG. 4 instructs the user to concurrently press the <Ctl>, <Alt>, and <Del> keys to permit the user to then enter a username and password to unlock the operating system's desktop or console.

Figure 5:
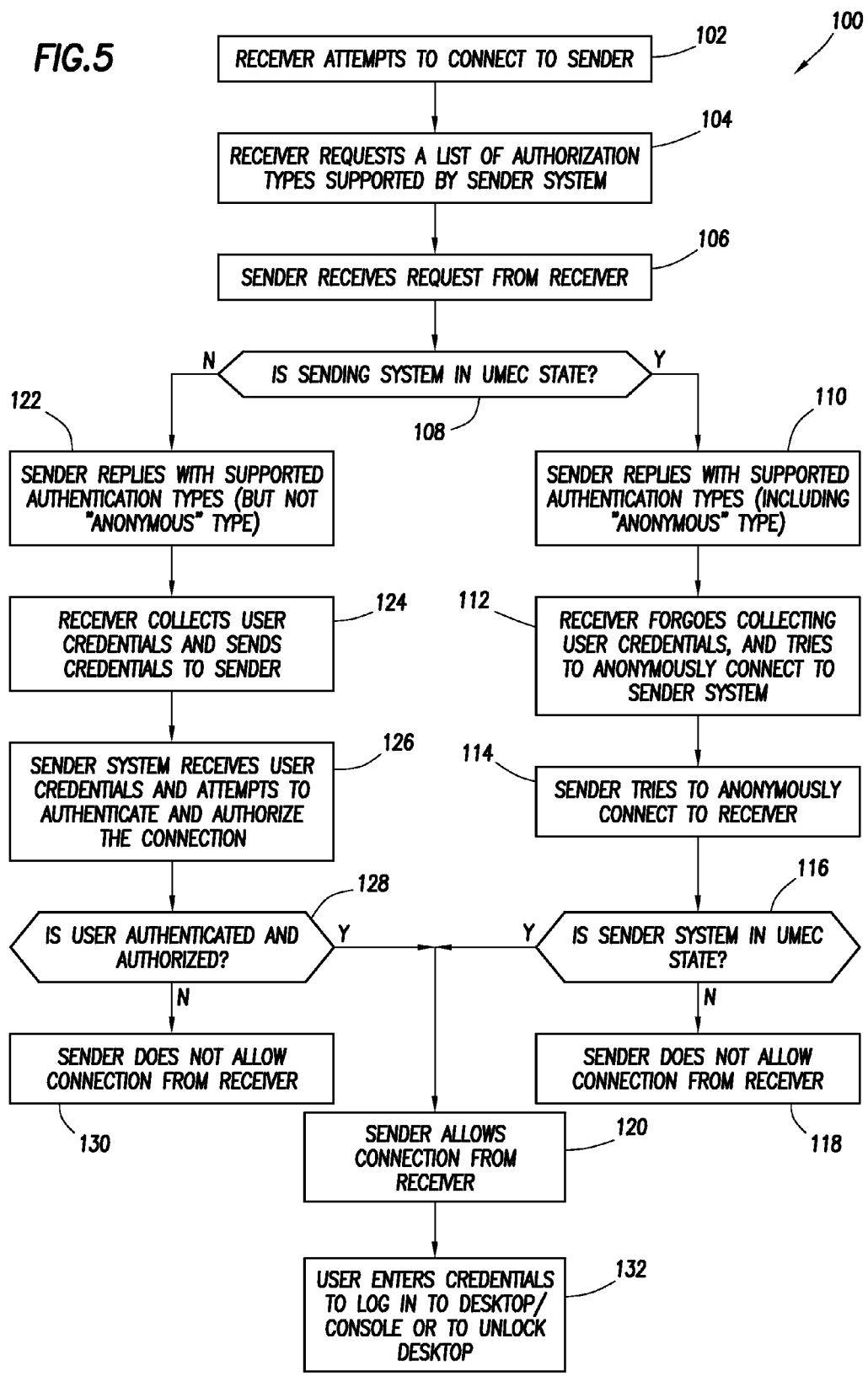
FIG. 5 illustrates a method by which the receiving system interacts with the sending system to forego collecting user credentials in accordance with various embodiments.

FIG. 5 illustrates a method 100 in accordance with embodiments. At 102, the receiver 36 attempts to connect to the sender 22. At 104, the receiver 36 requests a list of authentication types supported by the sending system 12. At 106, method 100 comprises the sender 22 receives the request from the receiver 36. At 108, the sending system determines whether the sending system 12 is in the UMEC state. If the sending system 12 is in the UMEC state, then at 1 10, the sender 22 replies to the receiver 36 with the authentication type(s) supported by the sending system 22. The authentication types include at least a particular predetermined type that is interpreted by the receiver 36 as corresponding to the UMEC state. In at least one embodiment, this predetermined user authentication type is "anonymous." Upon receiving the anonymous user authentication type, at 112, the receiver 36 foregoes collecting user credentials and tries to connect to receiver. At 114, the sender 22 tries to connect with the receiver 36. At 116, sending system again determines whether the sending system is in the UMEC state. It is possible that the sending system is no longer in the sending system and thus the check is performed again. If the sending system is in the UMEC state, then at 120, the sender 22 allows the connection from the receiver 36. If the sending system 12, however, is not in the UMEC state, then at 118, the sender 22 disallows the attempted sender-receiver connection.

If, as determined at 108, the sending system 12 is not in the UMEC state, then at 122, the sender 22 replies to the receiver 36 with the authentication type(s) supported by the sending system 12. At 124, the receiver 30 collects the user credentials (e.g., username and password) and provides the credentials to the sending system for authentication of the attempted receiver-sender connection. If the user is authenticated (128), then the receiver-sender connection is allowed (1 20). Otherwise, if the user is not authenticated, at 130, the sender disallows the attempted sender-receiver connection.

Upon performing action 120, the connection between the receiver 36 and sender 22 has been allowed. The user may or may not have been authenticated depending on whether the sending system was in the UMEC state as explained above. Regardless of whether the user has been authenticated, at 132, the user is prompted to provide his or her credentials for purpose of logging in to the desktop or console or unlocking a locked desktop/console. If the sending system 12 has been in the UMEC state, then, per 130, the user will have been prompted to provide the credentials only once to establish the connection between the receiver 36 and sender 12 as well as to log in to the desktop/console. If, however, the sending system 12 was not in the UMEC state at 108, then the user will have entered the credentials twice, once at 124 and again at 132.

Figure 6:
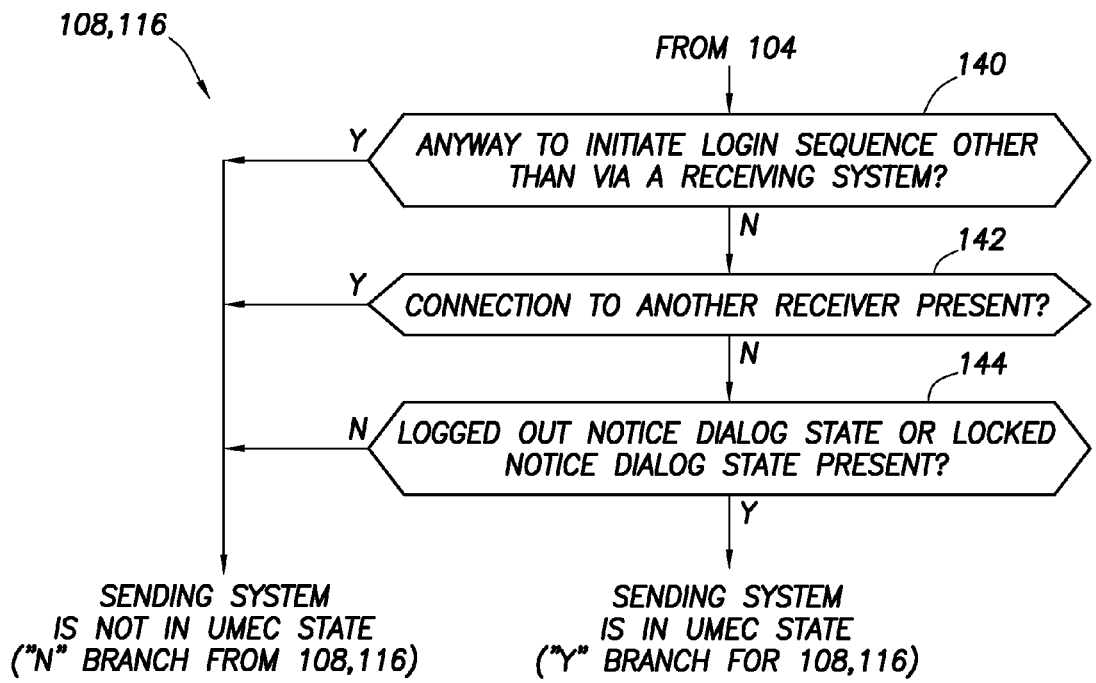
FIG. 6 shows a method by which the sending system determines whether the sending system is in a particular state that permits the receiving system to forego collecting user credentials in accordance with various embodiments.

FIG. 6 illustrates an embodiment of actions 108, 116 from FIG. 5 in which the sender 22 determines whether the sending system is in the UMEC state. FIG. 6 illustrates that determination 106 comprises checking for the three conditions listed above that define the UMEC state in accordance with at least some embodiments. Specifically, at 140 the sender 22 determines whether any way exists to initiate the login sequence other than by a receiving system. Examples of such other ways would include a separate keyboard, mouse, smart card reader, or other input device by which a user could be authenticated to the sending system. At 142, the sender 22 also determines whether a connection to another receiver 36 has already been established. At 144, the sender 22 further determines whether the logged out notice dialog box or locked notice dialog box are present.

In accordance with various embodiments, the sending system 12 employs various software components to permit a user to login to the desktop or console of the operating system 23. Such software components comprise, in some embodiments such as that illustrated in FIG. 7, a login process 152 and one or more graphical identification and authentication (GINA) libraries 154-160. The login process 152 may be part of, or associated with the operating system 23. Additionally, each GINA library (or simply "GINA") 154-160 is part of, or associated with the operating system 23. Each GINA library 154-160 comprises, for example, a Dynamic Link Library (DLL) file type. Each GINA library provides one or more application programming interfaces to various graphics-based software modules. Such modules render various images on a display. Examples of such images comprise the logged out notice dialog graphic of FIG. 3, the locked notice dialog graphic of FIG. 4, and other graphics. Such GINA libraries can be "chained" together in some embodiments such as the embodiment depicted in FIG. 7.

Figure 7:
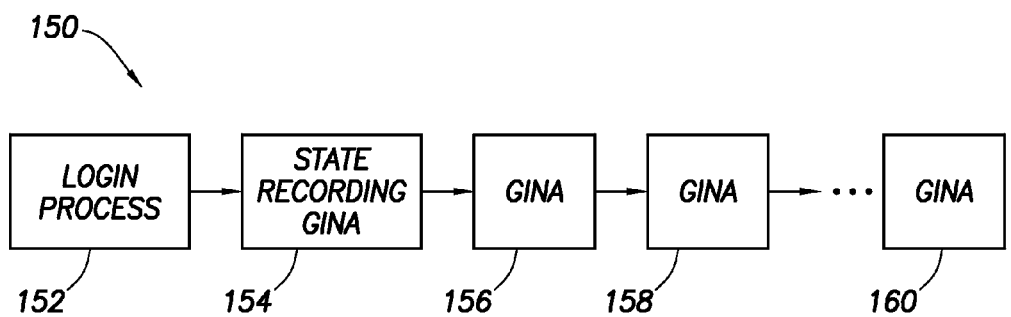
FIG. 7 illustrates various software components used to permit a user to log in to the sending system in accordance with various embodiments.

In FIG. 7, the login process 152 makes a call to the GINA libraries 154-160 to cause, for example, a particular graphical image to be generated. The last GINA library in the chain (i.e., GINA library 160) performs the requested the graphics operation. The intervening GINA libraries (e.g., GINA libraries 156 and 158) evaluate the request from the login process 152. The intervening GINAs 156 and 158 perform various functions, for example, altering the displayed appearance of the logged out/locked notices, providing third party authentication, etc. Each GINA passes on the request to the next GINA in the chain until the last GINA library 160 receives the request and responds as indicated by the request.

In accordance with various embodiments, a state recording GINA 154 is included in the chain of GINAs. The state recording GINA 154 may be included as the first GINA in the chain or at another location with the chain. The state recording GINA 154 evaluates the request to determine what image will be generated by GINA 160 once GINA 160 processes the request. The image to be generated may comprise, for example, the logged out notice dialog graphic or the locked notice dialog graphic of FIGS. 3 and 4, respectively. The state recording GINA 154 stores an indication of the new graphics state 72 in storage 70 of the sending system 12. The sender 22 accesses the storage 70 to determine the graphics state of the sending system 12. The sender 22 makes the determination of 124 (FIG. 6) by, for example, reading the state 72 of the sending system 12. The state 72 will indicate whether the logged out notice dialog graphic (FIG. 3) or the locked notice dialog graphic (FIG. 4) is currently being generated for the sending system. The sender 22 thus reads the state 72 to determine, in part, whether the sending system 12 is in the UMEC state.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:

a receiving system establishing a first connection to a sending system;

determining whether the sending system is in an unauthenticated mutually exclusive connection (UMEC) state;

foregoing collecting user credentials to establish a connection between the receiving and sending systems if the sending system is in the UMEC state; and collecting user credentials to establish a connection between the receiving and sending systems if the sending system is not in the UMEC state, wherein the UMEC state is a state in which it is not possible for another user to have already started to log in to the desktop or console of the sending system, nor for another user to be able to log in to or unlock the sending system's desktop or console.

2. The method of claim 1 wherein determining whether the sending system is in the UMEC state comprises determining whether the sending system enables user authentication via a mechanism other than by a receiving system.

3. The method of claim 1 wherein determining whether the sending system is in the UMEC state comprises determining whether the sending system already has a connection to a receiving system.

4. The method of claim 1 wherein determining whether the sending system is in the UMEC state comprises determining whether the sending system is generating a logged out notice dialog graphic.

5. The method of claim 1 wherein determining whether the sending system is in the UMEC state comprises determining whether the sending system is generating a locked notice dialog graphic.

6. The method of claim 1 further comprising again determining whether the sending system is in the UMEC state after foregoing collecting user credentials to establish a connection between the receiving and sending systems.

7. The method of claim 1 wherein if, before the user is successfully authenticated via the sending system instead of the receiving system, a connection to another receiving system is detected, the method further comprises invalidating the first connection.

8. A system, comprising:
a receiving logic configured to establish a connection over the network to a computer, wherein said receiving logic is capable of authenticating a user of said system and determining whether said computer is in an unauthenticated mutual exclusive connection UMEC state;
foregoes collecting user credentials if the receiving logic receives an indication from the computer that the computer is in the UMEC state and collects user credentials if indication indicates that the computer is not in the UMEC state, wherein the UMEC state is a state in which it is not possible for another user to have already started to log in to the desktop or console of the computer, nor for another user to be able to los in to or unlock the computer's desktop or console.

9. The system of claim 8 wherein said UMEC state comprises the computer precluding a user from being authenticating to the computer via a mechanism other than via receiving logic.

10. The system of claim 8 wherein said UMEC state comprises the computer not having another connection to a receiving logic.

11. The system of claim 8 wherein said UMEC state comprises a logged out notice dialog graphic being generated by the computer.

12. The system of claim 8 wherein said UMEC state comprises a locked notice dialog graphic being generated by the computer.

13. The system of claim 8 wherein said receiving logic checks a plurality of times whether the sending system is in the UMEC state before the connection is established.

14. The system of claim 8 wherein the receiving logic invalidates the connection if, before the user is successfully authenticated via the computer, another connection to receiving logic is detected.

15. A system, comprising:
a sending logic configured to establishes a connection over the network to a computer, wherein said sending logic receives a request from the computer for a type user authentication supported by the system; and
in response to receipt of the request, said sending logic determines whether the system is in an unauthenticated mutually exclusive connection (UMEC) state, and promotes the computer to provide user credentials only once to establish the connection if the system is in the UMEC state and twice to establish the connection if the system is not in the UMEC state, wherein the UMEC state is a state in which it is not possible for another user to have already started to log in to the desktop or console of the sending system, nor for another user to be able to log in to or unlock the sending system's desktop or console.

16. The system of claim 15 wherein the UMEC state comprises the system not having another established connection to the computer or another computer over the network.

17. The system of claim 15 wherein the UMEC state comprises the system precluding a user from being authenticating by the system via a mechanism other than by a computer connected to the system via the network.

18. The system of claim 15 wherein the UMEC state comprises a graphic selected from a group consisting of a logged out notice and a locked notice being generated by the system.

19. The system of claim 15 wherein the sending logic transmits a message to the computer as to the authentication type supported by the system.

20. The system of claim 15 further comprising a plurality of graphical identification and authentication (GINA) libraries in which at least one GINA library records the graphical state of the system and wherein said sending logic determines whether the system is in the UMEC state by examining the recorded graphical state.

\* \* \* \* \*

UNITED STATES PATENT AND TRADEMARK OFFICE
CERTIFICATE OF CORRECTION

PATENT NO. : 7,797,435 B2  
APPLICATION NO. : 11/669308  
DATED : September 14, 2010  
INVENTOR(S) : Roland M. Hochmuth et al.

Page 1 of 1

It is certified that error appears in the above-identified patent and that said Letters Patent is hereby corrected as shown below:

In column 7, line 31, in Claim 8, delete "mutual" and insert -- mutually --, therefor.

In column 7, line 39, in Claim 8, delete "los" and insert -- log --, therefor.

In column 8, line 12, in Claim 15, delete "establishes" and insert -- establish --, therefor.

Signed and Sealed this
Nineteenth Day of April, 2011

David J. Kappos
*Director of the United States Patent and Trademark Office*